Figure 1:
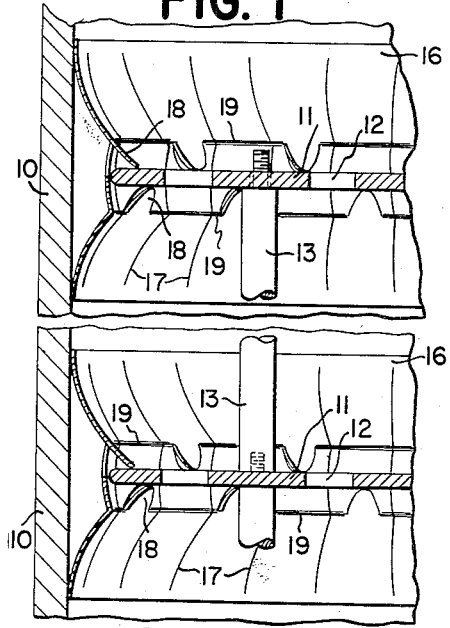

June 17, 1958 W. S. McVAY ET AL 2,839,280
PLATE TRAY DEFLECTOR
Filed Oct. 23, 1953

INVENTORS
WILLARD S. McVAY
WALTER R. STERRETT
BY Harry J. McCauley
ATTORNEY

United States Patent Office 2,839,280
Patented June 17, 1958

2,839,280

PLATE TRAY DEFLECTOR

Willard S. McVay and Walter R. Sterrett, Wilmington, Del., assignors to E. I. du Pont de Nemours & Company, Wilmington, Del., a corporation of Delaware Application October 23, 1953, Serial No. 388,010

2 Claims. (Cl. 261—113)

This invention relates to a plate tray deflector for fluid-fluid contacting columns and particularly to a snap-on plate tray deflector.

The manufacture of chemicals requires the utilization of a variety of designs of fluid-fluid contacting columns which consist of a vertically disposed enclosing shell, which is usually, though not necessarily, cylindrical in form, within which is mounted in superimposed relationship a multiplicity of plate trays which may be of the bubble cap variety or merely perforated, as in the case of sieve plates and shower plates. The plate trays are usually supported and spaced one from another by spacing members which pass through holes provided in the trays and are adapted to be connected to neighboring spacing members of the next higher and lower trays by screw threads or in some other manner. Apparatus of this type is often relatively large in size, sometimes being many feet in diameter and 100 or more feet high, housing a very large number of plate trays depending on the nature of the process of manufacture. The spaces between the plates and the inside periphery of the enclosing shell must be provided with means deflecting the flows of gas and liquid away from these regions and toward the active areas of the trays, thereby forestalling bypassing of one or more trays and the loss of contacting efficiency resulting therefrom. A great number of relatively expensive designs have been developed and utilized in the past for this purpose; however, these have proved quite disadvantageous because of their high first cost and the fact that their installation involves permanent attachment to either the tray or the inside of the shell, or to both, which complicates dismantling when periodic cleaning or replacement of the plate trays is necessary. Another complication is that the column shells are often considerably out-of-round, either as received from the manufacturer or after protracted use during which cranes are employed to erect and dismantle them, thus subjecting the shells to deforming strains. Also, it is often the case that the plate trays themselves are not perfectly round nor flat, so that the fitting required around the periphery is not the same at one point as at another and custom-made devices are, therefore, required for good results.

Figure 2:
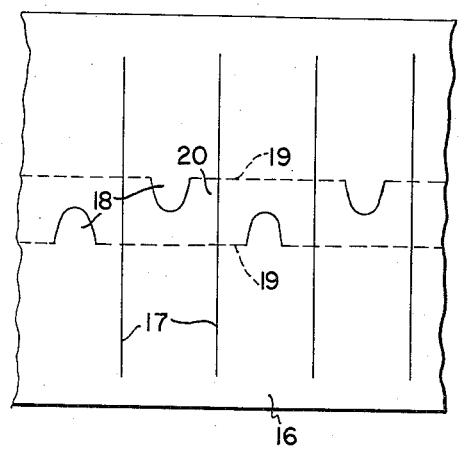
Figure 3:
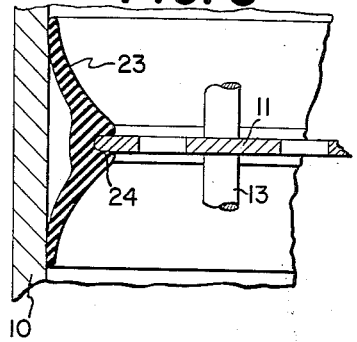
Figure 4:
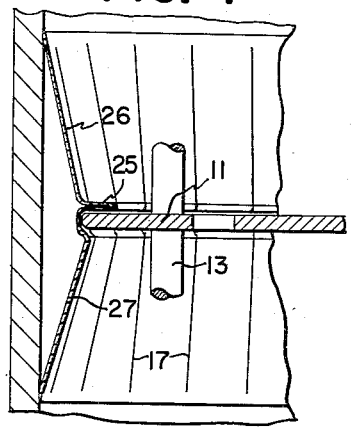
Figure 5:
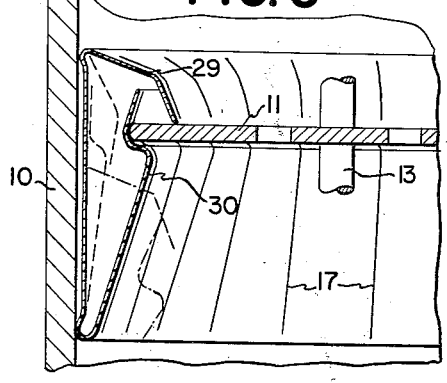

A primary object of this invention is to provide a snap-on deflector for plate trays used in fluid-fluid contact which can be readily detached from the plate trays and shells when it is desired to clean or replace individual plate trays. Another object of this invention is to provide a versatile plate tray deflector which is light in weight and economical in first cost. Yet another object of this invention is to provide a snap-on plate tray deflector which is self-adjusting to compensate for varying clearances between the inside periphery of the enclosing shell and individual plate trays. The manner in which these and other objects of this invention are obtained will become clear from the detailed description hereinafter set forth and the following drawings, in which:

Fig. 1 is a fragmentary schematic representation of a shower plate type column showing one embodiment of this invention in assembled relationship with a pair of successive plate trays, Fig. 2 is a plan view of a part of the length of the deflector of Fig. 1 showing a preferred construction design, Fig. 3 is a fragmentary schematic representation of another embodiment of plate tray deflector according to this invention which may be fabricated from either rubber or a suitable solid polymeric material, the deflector being shown in assembled relationship between a single plate tray and its enclosing shell, Fig. 4 is a fragmentary schematic representation of another embodiment of plate tray deflector shown in assembled sealing relationship, which design is particularly suited to fabrication from metal, and Fig. 5 is a fragmentary schematic representation of yet another embodiment of this invention which is suited to fabrication from metal, the position of the deflector in assembled relationship with the tray being shown in full line representation while two successive positions of the ends during disengagement from the plate tray are shown in broken line representation.

Generally, the plate tray deflector of our invention comprises a snap-on flexible strip deflectible lengthwise arcuately, provided along one side with means adapted to abut the edge of a plate tray and along the other side with a second means adapted to abut the inside periphery of the shell housing the tray, at least one of the two means being sufficiently resilient to abut against the adjacent members of the column and thereby substantially close off the space between the plate tray and the inside of the shell.

Referring to Fig. 1, a typical fluid-fluid contacting column may comprise enclosing shell 10 within which are mounted a multiplicity of plate trays 11, the trays shown in this figure being of the shower plate variety provided with relatively large holes 12 distributed in a regular pattern over the areas of the plate trays. The apparatus of Fig. 1 might be utilized for the absorption removal of a gaseous constituent from a main gas stream introduced at the bottom of the column by countercurrent contact with a liquid absorbent introduced above the top plate of the column, the liquid trickling down through the holes of successive plate trays for the full length of the column while the gas stream follows the reverse course. Intimate contacting between the gas and the liquid absorbent is thereby obtained, it being understood that this design of apparatus is equally applicable to fractionation, extraction and other chemical manufacturing operations as well as absorption.

As will be seen from Fig. 1, successive plate trays are spaced one from another by spacing members 13, of which only one is shown, the spacing members conveniently comprising solid metal rods which are provided with male and female threads at opposite ends for engagement with companion threads on neighboring spacing members, the plate trays 11 being drilled to permit free passage of the male threaded portions of the members 13.

One embodiment of plate tray deflector according to this invention comprises the metal strip 16, which may be fabricated according to the plan detailed in Fig. 2, strip 16 being resilient enough in the radial direction of the column to permit its ready snap-on engagement with the edges of the plate trays and the enclosing shell wall. For relatively small diameter columns it will be understood that 16 may be of sufficient length to provide a complete peripheral deflector in one continuous length of metal; however, for larger columns it is convenient to utilize two or more separate deflectors to effect the complete peripheral coverage, adjacent deflector being brought into tight abutment at the ends and the completing strip for the periphery being carefully cut to size if necessary.

Referring to Fig. 2, a preferred method of constructing the plate tray deflector of Fig. 1 is to utilize a spring steel strip, such as Armco–17–7PH stainless steel of, for example, 3″ width and 30 gage thickness. The central area of strip 16 is preferably provided with a series of shear slits 17 which, for the design detailed, might be 2½″ long spaced ¾″ apart. The metal in adjacent areas defined by slits 17 is punched in opposite directions to form lips 18 whereupon the metal strip is folded along dotted lines 19 to form the bifurcated cross section shown in Fig. 1 the separate legs of which are inclined in the uncompressed state at an angle of about 45° with the flat central belt 20 included between fold lines 19. The stamping and folding of the strip is preferably conducted with the metal in the annealed state, following which the strip is heat-treated to impart a spring temper. In use, shear slits 17 provide sufficient flexibility so that seal 16 can be curved around the column wall arcuately to accommodate the usual variations in clearance between the inside periphery of shell 10 and the outside edge of a single plate tray 11. Assembly in position is accomplished simply and easily by depressing the center portion of the deflector in an outward radial direction until opposite lips 18 engage the top and bottom sides of the plate tray, after which release of pressure on the deflector permits it to snap into tight engagement with neighboring structures across the annular space separating the shell and the plate tray. As a practical matter some slight passage of gas and liquid may occur through some of the slits 17 and also around the edges of the lips 18, but this is usually so small that it is not objectionable. It will be apparent from Fig. 1 that dismantling is merely the reverse of assembly, in that the operator may proceed from the top plate downwards, disengaging each deflector 16 in turn by depressing it centrally in an outward radial direction, thereby permitting the deflector to drop to the next lower plate where it can be collected after the plate tray is lifted from the spacing member 13.

The construction of this invention is well-suited to fabrication from rubber or a suitable solid polymeric material as indicated in Fig. 3, the deflector in this case taking the form of a molded strip 23 formed into a bifurcated cross section sufficiently resilient to bridge the annular space between the inside periphery of shell 10 and plate tray 11. Rubber and the polymeric materials suitable for the purposes contemplated are usually resilient enough so that it is not necessary to slit them laterally in the manner shown for slits 17 of the metal construction of Figs. 1 and 2 and, therefore, strips of these materials are operative to deflect liquid and gas from the region around the periphery of the plate trays. In this construction attachment with the plate trays is effected by engagement of the tray edges within the inner central reception depression 24 of the deflector strip.

Fig. 4 depicts another construction of metal deflector which is provided with a crimped-back central plate tray edge reception portion 25 which effectively deflects gas or liquid flow at the plate edge, it being understood that the leg portions 26 and 27 of the deflector are preferably provided with slits 17 over the lengths indicated to facilitate arcuate bending during assembly and disassembly.

The construction detailed in Fig. 5 represents yet another embodiment of deflector according to this invention which operates somewhat in the manner of an ordinary household safety pin in its engagement and disengagement with plate tray 11. In this construction the orientation of the leg portions 29 and 30 is reversed from their orientation in the preceding figures, the longer leg 30 being preferably formed at the bottom edge of the deflector, while the shorter leg 29 is adapted to spring over it and abut against the top side of plate tray 11. This arrangement of the legs insures relatively tight abutment with the plate trays. Again, the top and bottom portions of legs 29 and 30 are preferably slit as indicated at 17 to impart arcuate flexibility to the strip.

The method of assembly and disassembly of the embodiments of Figs. 3–5 is similar to that hereinbefore described for the embodiment of Figs. 1 and 2, merely requiring compression of the resilient leg portions of the devices and permitting their free snap-out to engage the plate tray edge or clear it for either placement or removal respectively. Concentric location of the plate trays during placement within the column is preferably facilitated by the use of spacing wedges driven between the plate edges and the shell wall, which may be left in place between the terminating ends of neighboring deflector strips without appreciably affecting the efficiency.

It will be understood that the deflectors hereinabove described are versatile in their application, being adapted for use with planar trays, dished or "pie plate" trays having conically inclined edges and even special designs of trays which do not have smooth arcuate edges, the only requirement being that the deflector must be proportioned to abut the peripheral edge of the tray around the circumference to bridge the clearance between the tray and the inside shell wall.

From the foregoing it will be apparent that the snap-on plate tray deflector of this invention is subject to relatively wide modifications without deviating from the essential spirit of this invention, wherefor it is intended to be limited only within the scope of the following claims.

What is claimed is:

1. A snap-on deflector for attachment to the periphery of a fluid-contacting plate tray mounted within a column housing said plate tray comprising a unitary resilient strip of metal provided with a multiplicity of lateral slits disposed inwardly of the edges and with plate tray-engaging means on one side of said strip disposed apart laterally of said strip a distance substantially equal to the thickness of said plate tray.

2. A snap-on deflector for attachment to the periphery of a fluid-contacting plate tray mounted within a column housing said plate tray comprising a unitary resilient strip of metal provided with a multiplicity of lateral slits across the central area of said strip and on one side with a multiplicity of slit lips oppositely disposed between successive ones of said lateral slits, the points of attachment of said lips with said strip being spaced laterally of the strip a distance of at least the thickness of a plate tray with which said deflector is to be assembled and the edges of said strip being bent in a direction away from said lips an amount greater than the radial clearance between the plate tray with which said deflector is to be assembled and the inside of the column housing said plate tray.

References Cited in the file of this patent
UNITED STATES PATENTS

| | | |
|---|---|---|
| 2,226,273 | Westefeldt | Dec. 24, 1940 |
| 2,309,446 | Ekkebus | Jan. 26, 1943 |
| 2,750,174 | Cogan | June 12, 1956 |